US 9,053,363 B1

(12) United States Patent
Nordstrom

(10) Patent No.: US 9,053,363 B1
(45) Date of Patent: Jun. 9, 2015

(54) OBJECT IDENTIFICATION IN VISUAL MEDIA

(71) Applicant: Google Inc., Mountain View, CA (US)

(72) Inventor: Paul G. Nordstrom, Seattle, WA (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/829,199

(22) Filed: Mar. 14, 2013

(51) Int. Cl.
G06K 9/62 (2006.01)
G06K 9/00 (2006.01)

(52) U.S. Cl.
CPC .................................. G06K 9/00536 (2013.01)

(58) Field of Classification Search
None
See application file for complete search history.

(56) References Cited

U.S. PATENT DOCUMENTS

| | | | | |
|---|---|---|---|---|
| 5,839,112 | A * | 11/1998 | Schreitmueller et al. | 705/4 |
| 8,582,802 | B2 * | 11/2013 | Clippard et al. | 382/100 |
| 2008/0267487 | A1 * | 10/2008 | Siri | 382/141 |
| 2012/0050522 | A1 * | 3/2012 | Van Slyck et al. | 348/92 |
| 2012/0075343 | A1 * | 3/2012 | Chen et al. | 345/633 |

OTHER PUBLICATIONS

Mark A. Livingston, 'Augmented Reality: Applications and Current Research Issues,' 3D Virtual and Mixed Environments, Naval Research Laboratory, 49 pages.

Ke et al., 'An Augmented reality-based Application for Equipment Maintenance,' Mobile Computing Center & School of Automation Engineering, University of Electronic and Science Technology of China, Chengdu, China, 6 pages.

"Augmented Reality for Maintenance and Repair (ARMAR)," (online) [Retrieved from the Internet on Mar. 14, 2013], Retrieved at URL http://graphics.cs.columbia.edu/projects/armar/index.htm, 5 pages.

* cited by examiner

Primary Examiner — Brian P Werner
(74) Attorney, Agent, or Firm — Fish & Richardson P.C.

(57) ABSTRACT

Methods, systems, and apparatus, including computer programs encoded on a computer storage medium, for determining the identity of an object in an image where the object in the image is in a disassembled state. In one aspect, a method includes accessing previous interactive sessions, each of the interactive sessions including images of a reference object in one or more disassembled states and each of the interactive sessions specifying an identity of the reference object in an assembled state; processing an image of a first object to identify characteristics of the first object, the first object being in a disassembled state in the image; comparing the image of the first object in the disassembled state to images of reference objects in disassembled states; and determining an identity of the first object based on the comparison and the identities of the reference objects in assembled states specified in the interactive sessions.

18 Claims, 5 Drawing Sheets

Restoring a Manufacturer X Model Y Bicycle

OBJECT IDENTIFICATION IN VISUAL MEDIA

BACKGROUND

This specification relates to image processing. Image processing, for example, can be used to identify objects in images, e.g., identify objects in a photograph or video. Various image processing techniques can be used to identify objects such as, for example, scale invariant feature transform (SIFT), edge detection, and pixel matching.

SUMMARY

This specification describes technologies relating to identifying objects represented in visual media such as images and videos. In general, one innovative aspect of the subject matter described in this specification can be embodied in methods that include the actions of accessing previous interactive sessions, each of the interactive sessions including images of a reference object in one or more disassembled states and each of the interactive sessions specifying an identity of the reference object in an assembled state. The reference object in a disassembled state requires the assembly of one or more additional parts to be in the assembled state. The method can include processing an image of a first object to identify characteristics of the first object, the first object being in a disassembled state in the image. The method can include comparing the image of the first object in the disassembled state to images of reference objects in disassembled states included in the interactive sessions, and determining an identity of the first object based on the comparison and the identities of the reference objects in assembled states specified in the interactive sessions.

The method can include comparing the image of the first object in the disassembled state to images of reference objects in assembled states included in the interactive sessions, and identifying one or more additional parts required for the first object in the disassembled state to be in an assembled state based on the comparison of the image of the first object in the disassembled state to the images of the reference objects in assembled states. The method can include identifying one or more assembled parts of the first object in the disassembled state based on the comparison, each of the one or more assembled parts being an existing part of the first object in the disassembled state.

The method can include identifying one or more broken parts of the first object in the disassembled state based on the comparison, each of the one or more broken parts being an existing part of the first object in the disassembled state that is broken. The method can include identifying a particular reference object in a disassembled state as being most similar to the first object in the disassembled state based on the comparison, determining an identity of the particular reference object in an assembled state based on the identities of the reference objects in assembled states specified in the interactive sessions, and determining the identity of the first object in the disassembled state is the identity of the particular reference object in the assembled state.

The method can include comparing the image of a particular reference object in an assembled state to images of other reference objects in assembled states, and identifying one or more broken parts of the particular reference object in the assembled state based on the comparison of the image of the particular reference object in the assembled state to the images of the other reference objects in assembled states, each of the one or more broken parts being an existing part of the particular reference object in the assembled state that is broken.

Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by the data processing apparatus, cause the apparatus to perform the actions.

Particular embodiments of the subject matter described in this specification can be implemented so as to realize one or more of the following advantages. Data from previous interactive sessions showing the assembly or disassembly of an object can be processed and used to identify the object in images showing disassembled versions of the object. Thus the object can be correctly identified as such from an image showing a disassembled version of the object, e.g., by comparing the disassembled version to the various states of object assembly captured in the interactive sessions. This allows the object or parts thereof to be identified from the image of the disassembled object when the object may not otherwise be readily identifiable from the image.

Once the object is identified from the image of the disassembled object, the parts required to complete the assembly of the object can be determined by comparing the image of the disassembled object to images of the assembled object. The required parts can then be ordered to expedite the assembly process. Such an automatic part identification process reduces the time, cost and effort otherwise required to determine which parts are or may be needed.

Broken parts of an object can also be identified by comparing an image of the object, either in a disassembled or assembled state, to known images of the object in which the object is without any broken parts. Such an automatic broken part identification process reduces the time, cost and effort otherwise required to identify broken parts. Further, such identification of broken or disassembled parts, and knowledge of the assembled object, can be used to estimate the time and cost of the repair/assembly, including the time to acquire the needed parts, the tools needed to complete the repair/assembly, and any other materials that may be required to complete the repair/assembly, e.g., grease.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally relates to determining the identity of an object in an image, or other visual media, where the object in the image is in a disassembled state, and therefore not readily identifiable as the assembled object. The identity of the object can be determined by comparing the image of the disassembled object with images from, for example, interactive sessions showing the assembly and/or disassembly of reference objects in various disassembled states. As further described below, an interactive session is a presentation that allows a user to experience an event or receive data related to the event.

Based on the comparisons, the disassembled object in the image can be matched to a reference object in a disassembled state from an image, e.g., video still, from an interactive session. Once the interactive session including the image of the matched reference object is determined, the identity of the reference object can be determined, e.g., based on the assembled reference object shown in the interactive session or from other information from the interactive session such as, for example, the title or description of the interactive session.

By way of an example, an antique store has a vintage vending machine that is missing numerous parts including all identifying markings. Based on a picture of the incomplete, e.g., disassembled, vintage vending machine and images from previous interactive sessions, e.g., interactive sessions showing the assembly/disassembly of vending machines, the vintage vending machine can be matched to one of the disassembled vending machines from the interactive sessions and identified accordingly.

In a similar manner broken, malfunctioning or out of specification parts from an object, disassembled or assembled, can be identified by comparing images of the object with images of reference objects from interactive sessions, which can include fully functioning and complete examples. The identified parts from the object that are different from the corresponding parts from the reference objects can be determined to be "of interest." These "of interest" parts can be identified as broken, malfunctioning, out of specification, or otherwise different.

Figure 1:
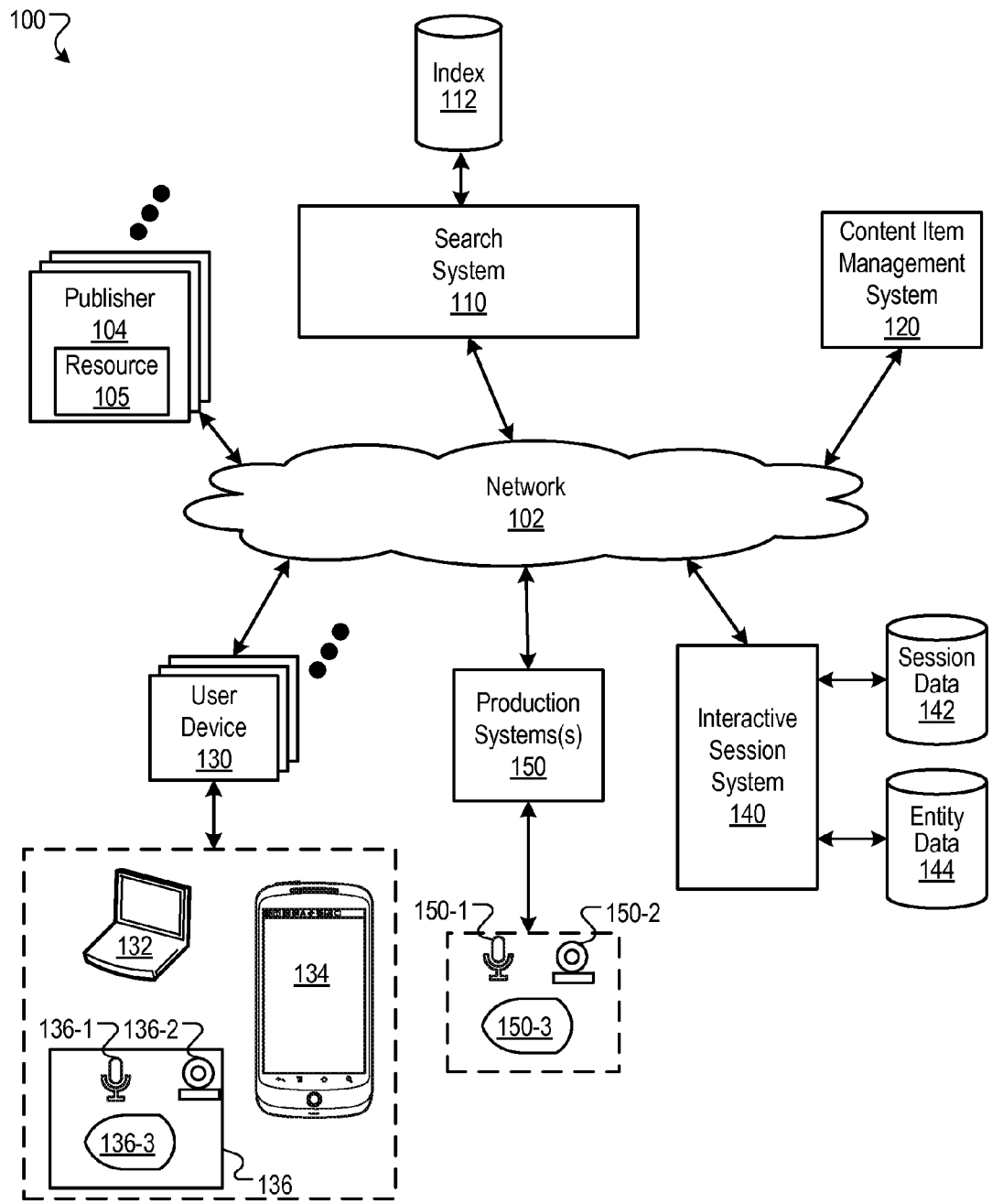
FIG. 1 is a block diagram of an example environment in which the identity of a disassembled object can be determined, and in which broken, malfunctioning or out of specification parts can be identified.

FIG. 1 is a block diagram of an example environment 100 in which the identity of a disassembled object can be determined, and in which broken, malfunctioning or out of specification parts can be identified. A data communication network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the publisher website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

In operation, a search engine 110 crawls the publisher web sites 104 and indexes the resources 105 provided by the publisher web sites 104 in an index 112. The search engine 110 can receive queries from user devices 130. In response to each query, the search engine 110 searches the index 112 to identify resources and information that are relevant to the query. The search engine 110 identifies the resources in the form of search results and returns the search results to the user device 130. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

A user device 130 receives the search results and presents them to a user. If a user selects a search result, the user device 130 requests the corresponding resource. The publisher of the web site 104 hosting the resource receives the request for the resource and provides the resource to the user device 130.

In situations in which the systems described here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content item management system 120 provides content items for presentation with the resources 105. A variety of appropriate content items can be provided—one example content item is an advertisement. In the case of advertisements, the content item management system 120 allows advertisers to define selection rules that take into account attributes of the particular user to provide relevant advertisements for the users. Example selection rules include keyword selection, in which advertisers provide bids for keywords that are present in either search queries or resource content or metadata. Advertisements that are associated with keywords having bids that result in an advertisement slot being awarded in response to an auction are selected for displaying in the advertisement slots.

A user device 130 is an electronic device, or collection of devices, that is capable of requesting and receiving resources over the network 102. Example user devices 130 include personal computers 132, mobile communication devices 134, and other devices that can send and receive data 136 over the network 102. A user device 130 typically includes a user application, e.g., a web browser, that sends and receives data over the network 102, generally in response to user actions. The web browser can enable a user to display and interact with text, images, videos, music and other information typically located on a web page at a website on the world wide web or a local area network.

An interactive session system 140 is also accessible by the user devices 130 over the network 102. The interactive session system 140 serves interactive sessions and data related to interactive sessions to users of user devices 130. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents their intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 140 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by expert assistants or non-expert users. The term "expert assistant" is used in this specification to refer to a user or entity that has been accepted by the system 140 for a category, e.g., as a result of the user's or entity's having provided credentials or demonstrated a high level of skill. Examples include a licensed contractor for construction related videos or a company that produces sessions for a particular product the company manufactures and a user that has produced a large number of highly rated sessions In some implementations, the content item management system 120 can provide content items with the interactive sessions. In the case of advertisements, the content item management system 120 may select advertisements based on the subject matter of a session, the event type, and the user's intent. For example, for a repair event, the content item management system 120 may provide advertisements for providers of tools and parts that are listed in the list of tools and parts required to accomplish the repair task.

Production systems 150 can be used to create sessions. Production systems 150 may range from studios to simple hand-held video recording systems. Generally, a production system 150 is a system that includes one or more of an audio input device 150-1, a video input device 150-2, an optional display device 150-3, and optionally other input and output devices and production processes that are used to create sessions. For example, post production processes may be used to add metadata to an interactive session. Such metadata may include, for example, keywords and topical information that can be used to classify the session to one or more topical categories; a list of tools and parts required for a particular session and descriptions of the tools and parts; and so on.

Tactical sensory input devices may also be used in a production system 150. For example, a particular interactive session may provide input data for a "G-suit" that applies pressure to a user's body and that the user interprets as simulated motion. Accordingly, appropriate input systems are used in the production system 150 to generate and store the input data for the interactive session.

Production systems 150 may also be or include devices that are attached to a person. For example, for "point of view" sessions, wearable computer devices that include a camera input device and microphone input device may be worn on a user's person during the time the user is creating the session.

The sessions are stored as sessions data 142 and are associated with authoring entities by entity data 144. A user can use a user device 130 to access the interactive session system 140 to request a session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

A user experiences a session by use of one or more user devices 130. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time or near-real time. A real time or near-real time interactive session can be an interactive session that is created in response to a user request for the interactive session. For example, real-time or near-real time sessions may be provided by a company for repairing a product sold by the company when the user cannot find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

Figure 2:
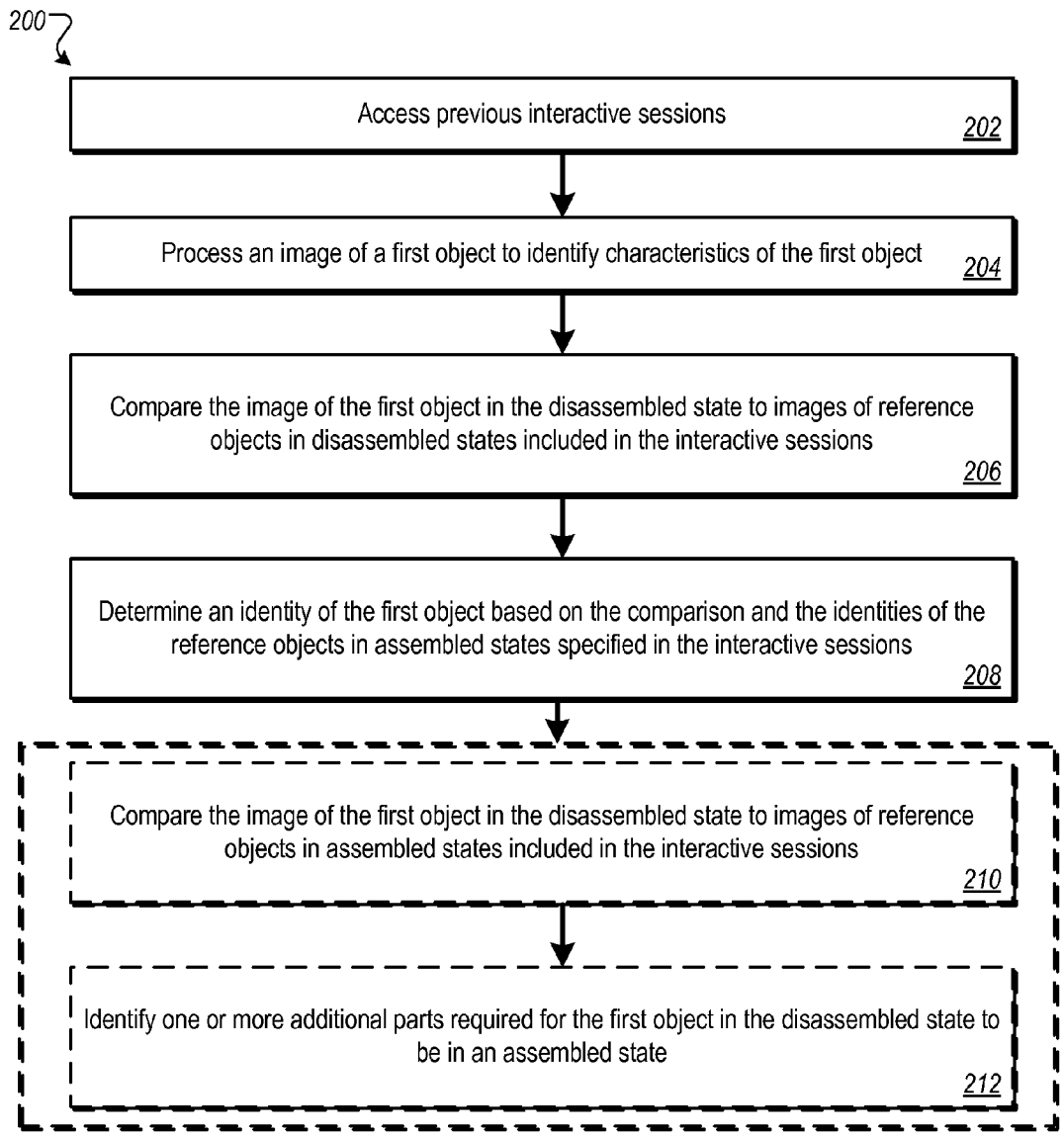
FIG. 2 is a flow diagram of an example process for determining the identity of an object in visual media.

In some implementations, the interactive session system 140 can determine the identity of objects represented in visual media, whether the objects are in disassembled or assembled states. Such visual media can, for example, include images, videos, pictures and other graphical representations of objects. Additionally, or alternatively, in some implementations, the interactive session system 140 can identify broken, malfunctioning or out of specification parts from an object represented in visual media, whether the objects are in disassembled or assembled states. The operation of the interactive session system 140 is further described with reference to FIG. 2, which is a flow diagram of an example process for determining the identity of an object in visual media.

Previous interactive sessions are accessed (202). As described above, an interactive session refers to a presentation that allows a user to experience an event or receive data related to the event. An interactive session can include, for example, visual media with images of a reference object in one or more disassembled states and/or an assembled state. A reference object is a known object, e.g., with a known identity or other characteristics, against which other objects can be compared. For example, the interactive session can be an assistance event teaching a user how to assemble a particular model bicycle, e.g., reference object. To this end, the interactive session can include images of the bicycle at various states of assembly, e.g., an early assembly state in which the bicycle is largely disassembled, a mid-assembly state in which the bicycle is about halfway through the assembly process and a near-complete or complete assembly state in which the bicycle is mostly assembled. However, an interactive session can include images of more or less than three assembly/disassembly states, e.g., an interactive session can include images of assembly/disassembly corresponding to the addition of each and every part added to or removed from the reference object.

Figure 3A:
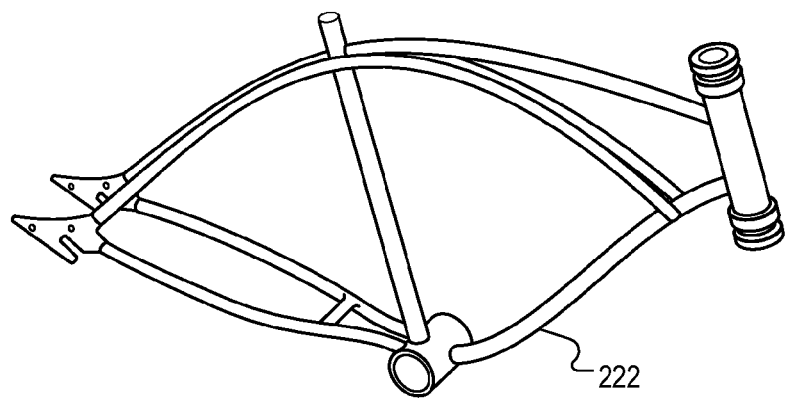
FIG. 3A is an example image from an interactive session showing a reference object in a first disassembled state.
Figure 3B:
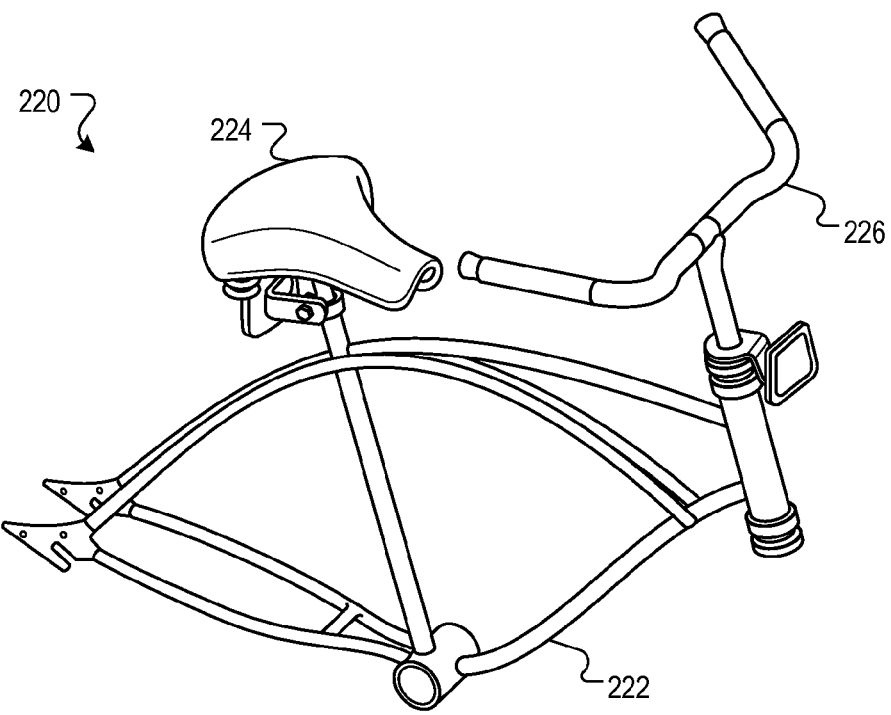
FIG. 3B is an example image from an interactive session showing the reference object in second disassembled state.
Figure 3C:
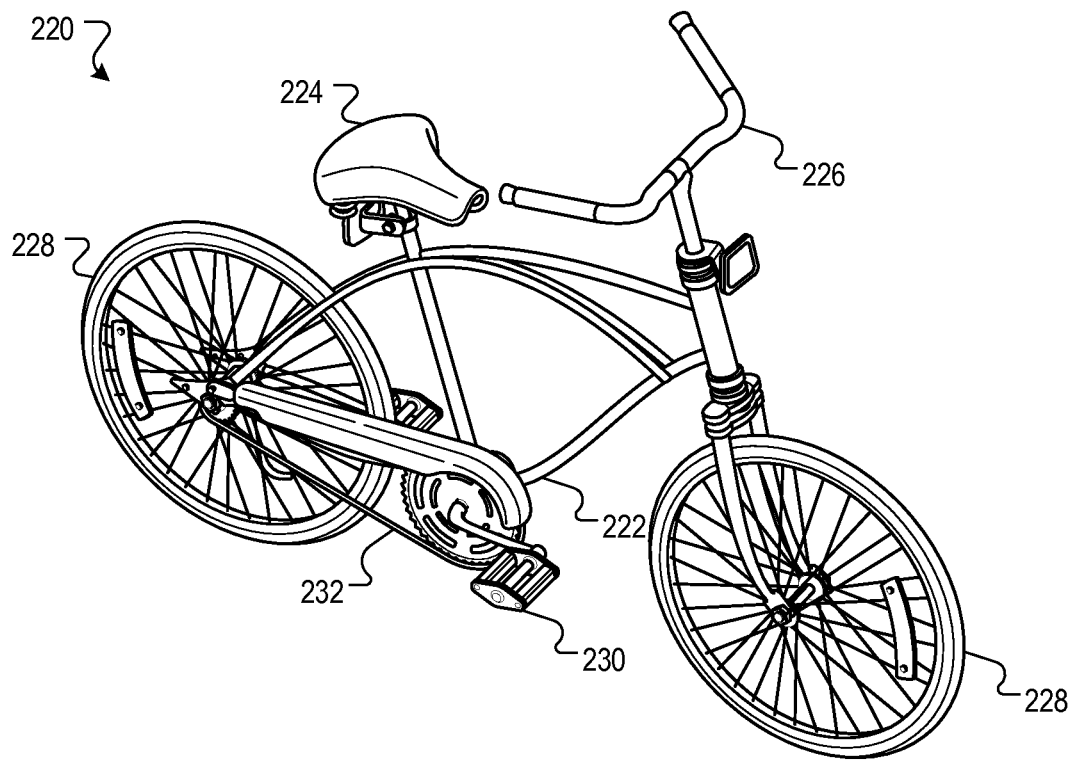
FIG. 3C is an example image from an interactive session showing the reference object in an assembled state.

FIGS. 3A-3C show images of various assembly/disassembly states of a reference object from an interactive session. More particularly, FIG. 3A is an example image from an interactive session showing a reference object 220 in first disassembled state. FIG. 3B is an example image from an interactive session showing the reference object 220 in a second disassembled state. FIG. 3C is an example image from an interactive session showing the reference object 220 in an assembled state. The reference object 220 in FIGS. 3A-3C is a bicycle 220.

An object, reference or otherwise, can be any visible or tangible element or thing captured or otherwise represented in visual media. For example, an object can be a bicycle or an engine. In some implementations, the interactive session system 140 accepts inputs from human evaluators to designate reference objects in particular images in the interactive sessions as being at particular states of assembly/disassembly. In some implementations, the interactive session system 140 analyzes the interactive sessions to designate or determine that reference objects in particular images in the interactive sessions are at particular states of assembly/disassembly, for example, based on changes in the reference objects from image to image. For example, the interactive session system 140 can designate or determine assembly/disassembly states based on image analysis techniques to compare the number/types of parts on a reference object in a given image with the number/types of parts on the reference object in different images in the interactive session.

In a similar manner, the interactive session system 140 can also identify particular parts, e.g., components, of a reference object based on the additions, or removals, from the reference object in different assembly/disassembly states in different images from one or more interactive sessions. For example, the reference object depicted in the image in FIG. 3A includes a frame 222. The next sequence of images from the interactive session include the reference object with additional components, e.g., as depicted in the image in FIG. 3B with additional parts including a seat 224 and handlebars 226. The interactive session system 140 can analyze the images of the reference object at each assembly/disassembly state, e.g., on a per-image basis, and identify each part, e.g., by a unique identifier, that is added as a component of the reference object. In some implementations, the interactive session system 140 can use image process techniques, as described below, to compare the various parts to parts in a data store, e.g., from numerous object manufacturers, and determine the identity of the component, e.g., part number. The interactive session system 140 can store data specifying such parts, e.g., graphical description of the parts, and corresponding part numbers or identifiers, in a parts data store for later access.

An interactive session can also specify an identity of the reference object in an assembled state. The identity of the reference object in an assembled state is, for example, the name of the reference object in a final or complete, or near-final or near-complete, form, as opposed the individual names/identities of the constituent parts of the reference object. By way of an example, a bicycle/reference object 220 in FIG. 3C includes constituent components such as a frame 222, wheels 228, seat 224, handle bars 226, petals 230, and chain 232. The identity of the reference object with all of the constituent components assembled together is a bicycle. Conversely, the identity of any of the bicycle's constituent components, e.g., a wheel, is, for example, the name of that component and is different from the identity of that component assembled with all of the other constituent components, e.g., the bicycle/reference object.

Thus a reference object can have numerous constituent components. A reference object in a disassembled state requires the assembly of one or more additional parts, e.g., components, to be in the assembled state. For example, the assembly of the handle bars 226 and seat 224 to the frame 222, e.g., as shown in FIG. 3B, is a reference object/bicycle 220 in a disassembled state because the wheels 228, petals 230, and chain 232, are missing, which are shown in FIG. 3C. A reference object in the assembled state has most or all of its constituent components or parts. For example, after the wheels 228, petals 230, and chain 232 have been added to the assembled handle bars 226, seat 224 and frame 222, the bicycle/reference object 220 is in an assembled state.

A reference object is in an assembled state if the interactive session system 140 can identify the reference object as such, for example, by using image processing techniques to compare the image of the reference object to images of know assembled objects, e.g., as specified by evaluators, and determining that the comparison indicates a similarity between the reference object and a known assembled object satisfies a threshold similarity. Thus, even if the assembled reference object is missing one or more constituent components, the interactive session system 140 can identify it as being in an assembled state as long as the assembled constituent components sufficiently characterize the reference object, e.g., based on the similarity measure. The interactive session system 140 can identify an object as being in a disassembled state if the interactive session system 140 determines that the object is not in an assembled state.

The identity of the reference object in the assembled state can be specified by the interactive session, for example, by the expert in the interactive session speaking the identity or from other audio content of the interactive session, in textual content included in the interactive session, in metadata for the interactive sessions, e.g., event topic classification, title, summary of the interactive session, to name just a few.

In some implementations, the interactive session system 140 accesses previous, e.g., past in time, interactive sessions from the sessions data 142, for example, in response to a request to identify an object in visual media. For example, the request can be initiated by a user of a user device 130, e.g., through the search system 110, and include or identify visual media showing a disassembled object that the user desires to identify.

An image of a first object, e.g., image of the bicycle 220, or other visual media representing the first object, is processed to identify characteristics of the first object, where the object is in a disassembled state (204). As described above, in some implementations, the interactive session system 140 receives the image as a part of a request, e.g., the image is specified or represented in data or a data file received with or identified by the request. An image of the first object is a graphical representation or depiction of the first object. For example, an image can be a photograph or drawing of the first object, or a video segment or video still showing the first object.

In some implementations, the interactive session system 140 can use various techniques to identify characteristics of the first object in the image such as scale invariant feature transform (SIFT), edge detection, interest point detection, and other appropriate image processing techniques. A characteristic of the first object defines a feature of the first object or image that can be used to compare and/or contrast the first object with other objects or images of the other objects. For example, as described below, such characteristics can be used to match the disassembled first object to a disassembled reference object or otherwise determine similarities between the first object and reference objects.

Figure 3D:
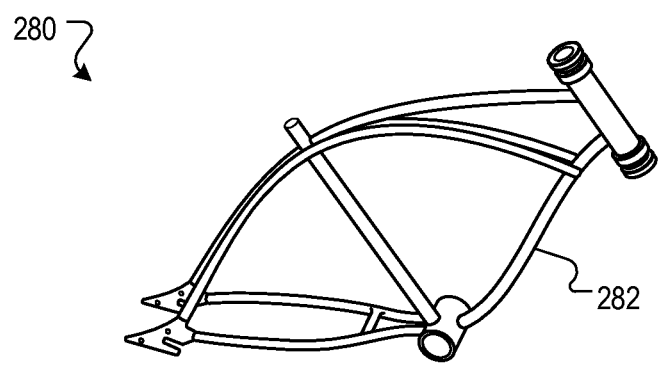
FIG. 3D is an example image of the first object in a disassembled state.

The image of the first object in the disassembled state is compared to images of reference objects in disassembled states included in the interactive sessions (206). In some implementations, the interactive session system 140 compares the image of the first object in the disassembled state to images of reference objects in disassembled states. FIG. 3D is an example image of the first object 280 in a disassembled state. The first object 280 in FIG. 3D is a disassembled bicycle 280. More particularly, the disassembled bicycle 280 depicted in FIG. 3D includes only a frame 282.

The interactive session system 140 can compare the image of the first object to the images of reference objects in numerous ways. For example, the interactive session system 140 can use the characteristics identified in the process 204 in a pixel or feature matching process to compare the pixels or features (a "pixel group") of the image of the first object to pixel groups of images of reference objects, with known identities, from a corpora of images from the interactive sessions. In some implementations, if the number of matched pixels or features between an image of a reference object and the pixel group from the image of the first object satisfy a similarity threshold value, the interactive session system 140 can determine the reference object and the first object match. For example, the similarity threshold value can be a 90% match or 90% similarity in pixels, a threshold cosine similarity value based on a feature vector comparison, or any other match or similarity values.

As the interactive session system 140 can compare the image of the first object to numerous images of reference objects and determine corresponding similarities between the image of the first object and each of the numerous images of reference objects, in some implementations, the interactive session system 140 can identify an image of a particular reference object in a disassembled state as being the most similar to the image of the first object in the disassembled state. The interactive session system 140 can identify the image of a reference object that is most similar to that of the first object based on the similarity measures derived from the comparisons from the process 206, e.g., derived from the number of matched pixels or features between the image of the reference object and the image of the first object. The interactive session system 140 can identify the image of the reference object with the highest similarity measure as being most similar to the image of the first object.

In some implementations, the interactive session system 140 focuses on the objects in the images as discounts any background features in the images under analysis, e.g., based on the image processing techniques described herein, such that the background features do not influence the comparison and matching processes.

In some implementations, the image of the first object, e.g., bicycle 220, may be from a different perspective, e.g., a different scale or orientation, than that of a particular image of a reference object subject to the comparison process. As such, the interactive session system 140 can manipulate, e.g., scale or rotate, the reference object or first object through various image processing techniques, to facilitate the comparison process. Such image processing techniques can be based on, for example, bilinear interpolation and geometric transforms.

The interactive session system 140 compares, for example, the first object 280, e.g., depicted in FIG. 3D, to the reference object 220, e.g., depicted in FIG. 3A, during the process 206. Given that the first object 280 and the reference object 220 are depicted in different orientations and scales, the interactive session system 140 accounts for such differences, as described above, during the comparison process. In some implementations, the interactive session system 140 compares the first object 280 with all or a subset of the reference objects in the interactive sessions from the session data 142.

An identity of the first object, e.g., bicycle 220, is determined based on the comparison and the identities of the reference objects in assembled states specified in the interactive sessions (208). As described above, in some implementations, the interactive session system 140 can determine a pixel group, e.g., representing the object, from the image of the first object in a disassembled state is similar or the same as that of an image from a reference object in a disassembled state based on the comparison/matching process, e.g., a pixel-to-pixel or feature-to-feature comparison process.

The interactive session system 140 can, for example, parse or otherwise analyze the interactive session including the matched reference object in a disassembled state, or metadata of the interactive session, to determine the identity of an assembled version of the reference object included or referenced in the same interactive session. As described above, the identity of the reference object in the assembled state can be specified or referenced by, for example, the expert in the interactive session speaking the identify or from other audio content of the interactive session, in textual content included in the interactive session, in metadata for the interactive sessions, e.g., event topic classification, title, summary of the interactive session, to name just a few. For example, if the title of the interactive session is textually displayed during the interactive session and is "Restoring a Manufacturer X Model Y Bicycle," e.g., as depicted in the image in FIG. 3A, the interactive session system 140 can analyze the interactive session data, e.g., the data specifying the title, to determine the identity of the reference object in the assembled state.

By way of another example, if the metadata of the interactive session includes a summary of the assistance event in the interactive session describing that the interactive session relates to restoring a Manufacturer X Model Y Bicycle, the interactive session system 140 can semantically analyze the metadata, e.g., through latent semantic analysis techniques, and extract the identity of the reference object in the assembled state.

For clarity, the interactive session need not include an image, or graphical representation, of the assembled reference object but, rather, can include only a reference, e.g., verbal or textual, to the identity of the assembled reference object. In either case, the interactive session system 140 can parse or otherwise analyze, e.g., based on semantic analysis processes, the interactive session data to determine the identity of an assembled version reference object.

Once the identity of the matched reference object in the assembled state has been determined the interactive session system 140 can determine the identity of the first object in the disassembled state is the identity of the particular reference object in the assembled state. For example, the interactive session system 140 can determine the identity of the first object 280 is "Manufacturer X Model Y Bicycle" based on the determination that the assembled version of the matched, disassembled reference object 220 is "Manufacturer X Model Y Bicycle." In some implementations, the interactive session system 140 responds to the request to identify an object in visual media by sending the determined identity of the object to the requesting user device 130. Alternatively, or in addition, the interactive session system 140 stores the identity of the first object 280 in a data store for later retrieval and use.

In some implementations, the interactive session system 140 provides a feedback mechanism, e.g., selectable hyperlink, to the requesting user device 130, along with the identity of the object, to permit a user of the user device 130 to provide feedback or rate the quality of the identification. Such feedback or rating can be used by the interactive session system 140 to tune the identification process 200, e.g., by use of a Rocchio-based algorithm.

The interactive session system 140, in addition or alternative to identifying objects, can identify components or parts required to complete the disassembled first object; identify broken, malfunctioning or out of specification components or parts; or both, as described further below.

The image of the first object in the disassembled state is compared to images of reference objects in assembled states included in the interactive sessions (210). In some implementations, the interactive session system 140 identifies an interactive session that includes a matched reference object in an assembled state, e.g., based on the identification of a matched, disassembled reference object, and compares the components depicted in the image of the disassembled first object with the components depicted in the image of the assembled, matched reference object.

One or more additional parts required for the first object in the disassembled state to be in a assembled state are identified based on the comparison of the image of the first object in the disassembled state to the images of the reference objects in assembled states (212). In some implementations, the interactive session system 140 identifies the additional parts. For example, the interactive session system 140 compares the image of the first object 280 with the image of the assembled reference object 220 in FIG. 3C and determines that the additional parts are wheels 228, seat 224, handle bars 226, petals 230, and a chain 232, as such parts are not depicted in the image of the disassembled first object 280 in FIG. 3D. The frame 222/282 is the only common part between the objects 220 and 280 in the two images. As described above with respect to identifying parts of an object, the interactive session system 140 can determine the identities of the additional parts, e.g., part numbers, and provide part numbers for those parts such that a user can readily obtain, e.g., order, the parts needed to complete the first object 280.

In some implementations, in a manner similar to that described above for identifying additional parts, the interactive session system 140 can identify assembled parts of the first object 280. An assembled part is an existing part of the first object 280. For example, the interactive session system 140 can analyze the image of the disassembled first object 280, compare the analyzed image with data specifying parts and part identifiers from the parts data store and determine which assembled parts are included in the disassembled first object 280, e.g., based on matches to parts specified in the parts data store.

Figure 3E:
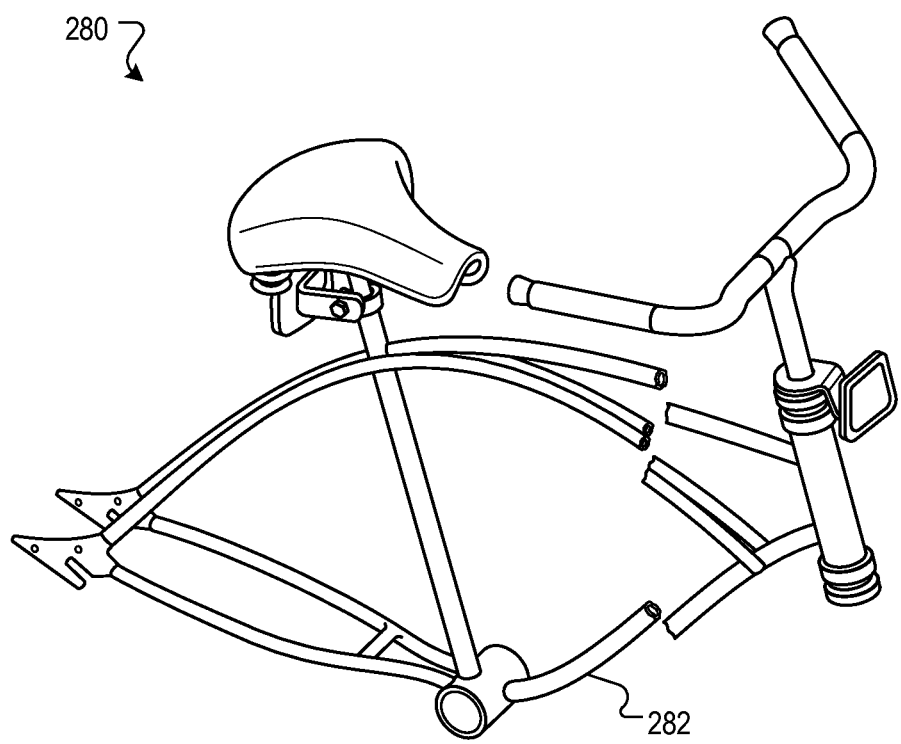
FIG. 3E is an example image of the first object with a broken part.

Likewise, in some implementations, the interactive session system 140 can identify broken parts of the first object 280, in disassembled or assembled states, or identify broken parts of reference objects, in disassembled or assembled states. A broken part is an existing part of the first object or reference object, as the case may be, that is broken, malfunctioning or out of specification components, e.g., a component that does not meet or conform to the manufacturer's guidelines or specifications. FIG. 3E is an example image of the first object 280 with a broken part 282. More specifically, the broken part 282 is a broken frame 282. By way of an example, as described above, the interactive session system 140 can identify a matching, disassembled reference object 220, e.g., as depicted in FIG. 3B, for the first object 280. Given the match, the interactive session system 140 can then compare, e.g., by the image processing techniques described above, the image of the first object 280 with the broken frame 282 to the image of the reference object 220 with the unbroken frame 222. Based on the comparison and the differences between the frames 222 and 282, the interactive session system 140 can determine that the frame 282 is broken, malfunctioning or out of specification and identify it as such, e.g., as the parts from the reference object 220 are considered to be unbroken and correct.

In a similar manner, the interactive session system 140 can compare images of references objects to images of other, e.g., matching, reference objects to determine differences and identify the parts accounting for the differences as broken parts or suspect parts, e.g., that should be evaluated by a human evaluator. For example, when the interactive session system 140 determines that one reference object, e.g., in an disassembled or assembled state, has a part that is different from the corresponding part on multiple other matching reference objects, e.g., all other matching reference objects, then the interactive session system 140 can identify that part as broken or suspect, as opposed to identifying other multiple reference objects as having a broken or suspect part.

In the above processes the data sources from which the images of the reference objects were extracted were interactive sessions. In some implementations, the interactive session system 140, in addition or alternative to the interactive sessions, can use data from other sources to extract images of reference objects, e.g., catalogs, object data sheets and user or repair manuals.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
accessing previous interactive sessions, each of the interactive sessions including images of a reference object in one or more disassembled states and each of the interactive sessions specifying an identity of the reference object in an assembled state, wherein the reference object in a disassembled state requires the assembly of one or more additional parts to be in the assembled state;
processing an image of a first object to identify characteristics of the first object, the first object being in a disassembled state in the image;
comparing the image of the first object in the disassembled state to images of reference objects in disassembled states included in the interactive sessions; and
determining, by one or more data processors, an identity of the first object based on the comparison and the identities of the reference objects in assembled states specified in the interactive sessions.

2. The method of claim 1, comprising:
comparing the image of the first object in the disassembled state to images of reference objects in assembled states included in the interactive sessions; and
identifying one or more additional parts required for the first object in the disassembled state to be in an assembled state based on the comparison of the image of the first object in the disassembled state to the images of the reference objects in assembled states.

3. The method of claim 1, comprising:
identifying one or more assembled parts of the first object in the disassembled state based on the comparison, each of the one or more assembled parts being an existing part of the first object in the disassembled state.

4. The method of claim 1, comprising:
identifying one or more broken parts of the first object in the disassembled state based on the comparison, each of the one or more broken parts being an existing part of the first object in the disassembled state that is broken.

5. The method of claim 1, wherein determining the identity of the first object comprises:
identifying a particular reference object, of the reference objects, in a disassembled state as being most similar to the first object in the disassembled state based on the comparison;
determining an identity of the particular reference object in an assembled state based on the identities of the reference objects in assembled states specified in the interactive sessions; and
determining the identity of the first object in the disassembled state is the identity of the particular reference object in the assembled state.

6. The method of claim 1, comprising:
comparing the image of a particular reference object in an assembled state to images of other reference objects in assembled states; and
identifying one or more broken parts of the particular reference object in the assembled state based on the comparison of the image of the particular reference object in the assembled state to the images of the other reference objects in assembled states, each of the one or more broken parts being an existing part of the particular reference object in the assembled state that is broken.

7. A system comprising:
one or more data processors; and
instructions stored on a computer-readable storage apparatus that when executed by the one or more data processors cause the one or more data processors to perform operations comprising:
accessing previous interactive sessions, each of the interactive sessions including images of a reference object in one or more disassembled states and each of the interactive sessions specifying an identity of the reference object in an assembled state, wherein the reference object in a disassembled state requires the assembly of one or more additional parts to be in the assembled state;
processing an image of a first object to identify characteristics of the first object, the first object being in a disassembled state in the image;
comparing the image of the first object in the disassembled state to images of reference objects in disassembled states included in the interactive sessions; and
determining an identity of the first object based on the comparison and the identities of the reference objects in assembled states specified in the interactive sessions.

8. The system of claim 7, wherein the instructions, when executed by the one or more data processors, cause the one or more data processors to perform operations comprising:
comparing the image of the first object in the disassembled state to images of reference objects in assembled states included in the interactive sessions; and
identifying one or more additional parts required for the first object in the disassembled state to be in an assembled state based on the comparison of the image of the first object in the disassembled state to the images of the reference objects in assembled states.

9. The system of claim 7, wherein the instructions, when executed by the one or more data processors, cause the one or more data processors to perform operations comprising:
identifying one or more assembled parts of the first object in the disassembled state based on the comparison, each of the one or more assembled parts being an existing part of the first object in the disassembled state.

10. The system of claim 7, wherein the instructions, when executed by the one or more data processors, cause the one or more data processors to perform operations comprising:
identifying one or more broken parts of the first object in the disassembled state based on the comparison, each of the one or more broken parts being an existing part of the first object in the disassembled state that is broken.

11. The system of claim 7, wherein determining the identity of the first object comprises:
identifying a particular reference object, of the reference objects, in a disassembled state as being most similar to the first object in the disassembled state based on the comparison;
determining an identity of the particular reference object in an assembled state based on the identities of the reference objects in assembled states specified in the interactive sessions; and
determining the identity of the first object in the disassembled state is the identity of the particular reference object in the assembled state.

12. The system of claim 7, wherein the instructions, when executed by the one or more data processors, cause the one or more data processors to perform operations comprising:
comparing the image of a particular reference object in an assembled state to images of other reference objects in assembled states; and identifying one or more broken parts of the particular reference object in the assembled state based on the comparison of the image of the particular reference object in the assembled state to the images of the other reference objects in assembled states, each of the one or more broken parts being an existing part of the particular reference object in the assembled state that is broken.

13. A computer-readable storage medium having instructions stored thereon, which, when executed by one or more data processors, cause the one or more processor to perform operations comprising:

accessing previous interactive sessions, each of the interactive sessions including images of a reference object in one or more disassembled states and each of the interactive sessions specifying an identity of the reference object in an assembled state, wherein the reference object in a disassembled state requires the assembly of one or more additional parts to be in the assembled state;

processing an image of a first object to identify characteristics of the first object, the first object being in a disassembled state in the image;

comparing the image of the first object in the disassembled state to images of reference objects in disassembled states included in the interactive sessions; and determining an identity of the first object based on the comparison and the identities of the reference objects in assembled states specified in the interactive sessions.

14. The computer-readable storage medium of claim 13, wherein the instructions, when executed by the one or more data processors, cause the one or more data processors to perform operations comprising:

comparing the image of the first object in the disassembled state to images of reference objects in assembled states included in the interactive sessions; and identifying one or more additional parts required for the first object in the disassembled state to be in an assembled state based on the comparison of the image of the first object in the disassembled state to the images of the reference objects in assembled states.

15. The computer-readable storage medium of claim 13, wherein the instructions, when executed by the one or more data processors, cause the one or more data processors to perform operations comprising:

identifying one or more assembled parts of the first object in the disassembled state based on the comparison, each of the one or more assembled parts being an existing part of the first object in the disassembled state.

16. The computer-readable storage medium of claim 13, wherein the instructions, when executed by the one or more data processors, cause the one or more data processors to perform operations comprising:

identifying one or more broken parts of the first object in the disassembled state based on the comparison, each of the one or more broken parts being an existing part of the first object in the disassembled state that is broken.

17. The computer-readable storage medium of claim 13, wherein determining the identity of the first object comprises:

identifying a particular reference object, of the reference objects, in a disassembled state as being most similar to the first object in the disassembled state based on the comparison;

determining an identity of the particular reference object in an assembled state based on the identities of the reference objects in assembled states specified in the interactive sessions; and determining the identity of the first object in the disassembled state is the identity of the particular reference object in the assembled state.

18. The computer-readable storage medium of claim 13, wherein the instructions, when executed by the one or more data processors, cause the one or more data processors to perform operations comprising:

comparing the image of a particular reference object in an assembled state to images of other reference objects in assembled states; and identifying one or more broken parts of the particular reference object in the assembled state based on the comparison of the image of the particular reference object in the assembled state to the images of the other reference objects in assembled states, each of the one or more broken parts being an existing part of the particular reference object in the assembled state that is broken.

* * * * *